Nov. 10, 1931.  R. L. JOHNSON  1,830,946
RAIL JOINT
Filed April 1, 1931  2 Sheets-Sheet 1

INVENTOR.
Raleigh L. Johnson
BY Lancaster, Allwine & Rommel
ATTORNEYS.

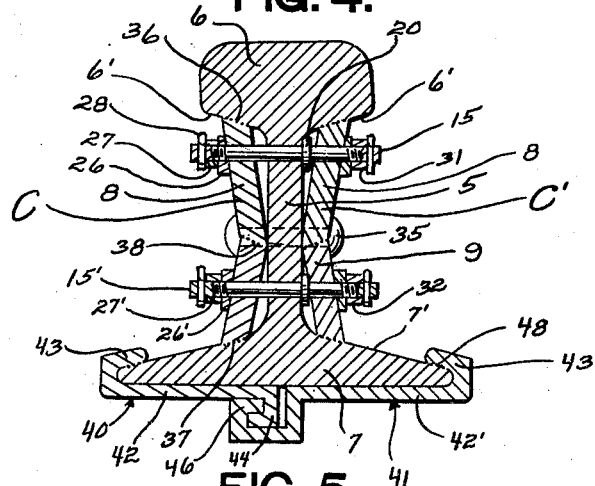
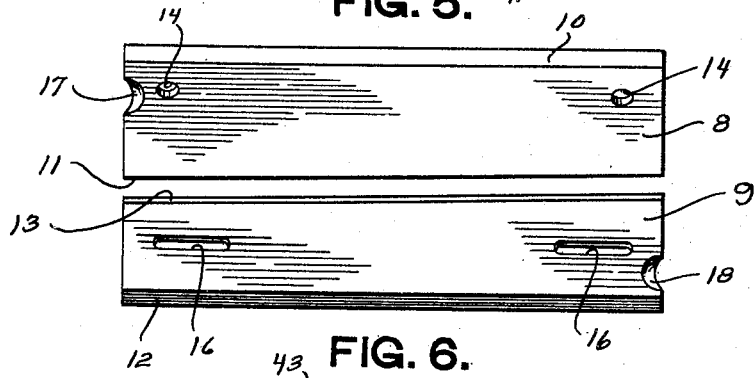
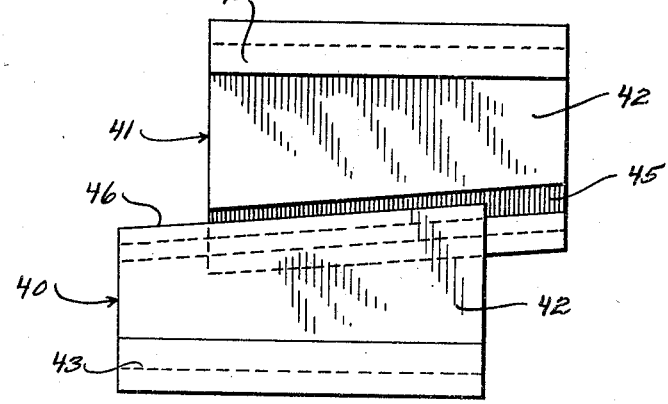
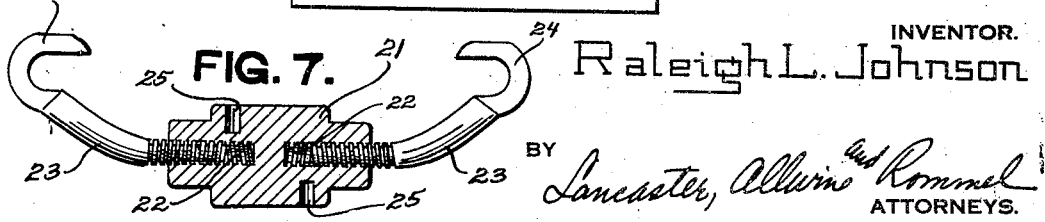

Patented Nov. 10, 1931

1,830,946

UNITED STATES PATENT OFFICE

RALEIGH L. JOHNSON, OF PHILADELPHIA, PENNSYLVANIA

RAIL JOINT

Application filed April 1, 1931. Serial No. 527,023.

The present invention relates to rail joints and the primary object of the invention is to provide an improved joint for connecting the ends of rails in a manner whereby the rail joint will remain in a firm and tight condition and not work loose due to vibration caused by the rolling stock.

A further object of the invention is to provide a rail joint embodying connecting plates adapted to be wedged into position between the treads and flanges of abutting rail ends in a manner to compensate for any slight variations in sizes of the rails.

A further object is to provide an improved rail joint embodying companion pairs of wedge plates adapted to be arranged at opposite sides of the webs of abutting rail ends and have line contact with the web at points substantially midway between the tread and flange of the rail.

A further object of the invention is to provide a rail joint embodying wedge joint plates adapted to be wedged into position spanning the abutting ends of a pair of rails, with novel means for positioning the wedge plate so as to form a substantially unbroken joint between the rail ends.

Other objects and advantages of the invention will be apparent during the course of the following detailed description, taken in connection with the accompanying drawings forming a part of this specification and in which drawings:—

Figure 4 is a section on the line 4—4 of Figure 3.

Figure 5 is a plan view looking at the inner side of one set of the wedge joint plates.

Figure 6 is a top plan view of the base clamp or rest for positioning beneath the flanges of the rails.

Figure 7 is a view part in section and part in elevation of the clamp or tightening device.

Figure 1:
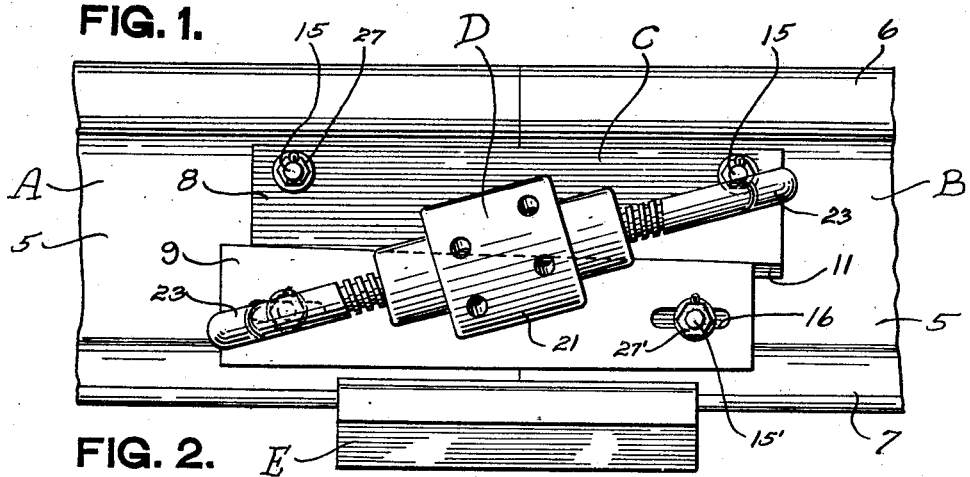
Figure 1 is a side view of the abutting ends of a pair of rails and showing a lower wedge plate in a position ready to be moved longitudinally into wedging relation with the upper plate.

Referring to the drawings in detail, and wherein similar reference characters designate corresponding parts thruout the several views, the letters A and B designate the abutting end portions of a pair of standard rails adapted to be connected by the joint plates C. The letter D designates a clamping or adjusting device for the joint plate C and the letter E designates a rest plate for positioning beneath the abutting ends of the rails A and B.

The rails A and B are of standard type and embody the web portions 5 provided at their upper edges with the ball or tread sections and along their lower edges with the flange or base 7 projecting equally to opposite sides of the webs. The tread 6 is formed with the usual beveled under edges 6′ while the base 7 is formed with the beveled upper surfaces 7′.

The joint plates C for positioning at each side of the webs 5 each embodies an upper and lower plate 8 and 9 respectively having a combined width greater than the height of the webs 5. The upper plate 8 is provided with a straight bearing edge 10 which is transversely beveled thruout its length, and a tapering lower edge 11 which is also beveled transversely thruout its length in a substantially parallel plane to the bevel of the upper edge 10. The lower plate 9 is formed with a straight lower bearing edge 12 which is transversely beveled thruout its length and a tapering upper edge 13 which is also transversely beveled thruout its length in an opposite direction to the beveled lower edge 12. The tapering meeting edges of the plates 8 and 9 form substantially wedge-shaped joint plate sections adapted to be wedged into position between the rail surfaces 6′ and 7′ by means of the clamping device D.

The upper plate 8 of each joint plate is provided with circular openings 14 adapted to receive stud coupling bolts 15, while the lower plate 9 of each joint plate is provided with elongated openings 16 adapted to receive stud coupling bolts 15'. The wider end of the upper plates 8 are notched as at 17, while the wider end of the lower plates 9 are notched as at 18 and these notched ends 17 and 18 provide means for attachment of the clamping device D for longitudinal sliding movement of the lower plates 9.

As will be observed in Figure 4, the joint plates do not have surface contact with the web 5 but only have line contact with the web at a point substantially midway the height of the web. From the point of contact of the joint plates with the web, the upper and lower plate sections extend in diverging relation to the web. When the joint plates are in assembled position, the upper beveled edges 10 of the upper plates 8 contact with the inclined tread surfaces 6' in spaced relation to the upper end of the web 5, while the beveled lower edges 12 of the lower plates 9 bear upon the beveled surfaces 7' of the rail base 7 in spaced relation to the bottom of the web 5. When the upper plates 8 are in position, the beveled lower edges 11 of the plates extend in diverging relation to the inclined surfaces 7'.

The stud bolts 15 and 15' are each formed on their shank portions with a shoulder 20 offset to one side of the center of the length of the bolts as clearly shown in Figure 4 and these shoulders are adapted to abut against one face of the web 5 so that like lengths of the bolts project beyond each face of the web. The studs 15 and 15' may be inserted thru circular openings drilled or punched in the web.

The clamping or adjusting device D comprises a turnbuckle 21 provided in its ends with oppositely screw threaded sockets 22 for threaded reception of a pair of clamp arms 23 having oppositely screw threaded ends for threading into the sockets. These clamp arms 23 are offset from the turnbuckle 21 and are provided at their outer ends with hooks 24 adapted to engage in the notches 17 and 18 of the plates 8 and 9 respectively. The turnbuckle 21 may be provided with radially opening pockets 25 adapted to receive a suitable bar for rotating the turnbuckle and these pockets are staggered about the turnbuckle to permit insertion of a bar into one of the pockets at any position of the turnbuckle.

In assembling the joint plates in connecting relation to the ends of the rails A and B, one of the stud bolts 15 is inserted thru openings provided in the upper portion of the web of each rail until the shoulders 20 abut with the webs. Considering Figure 4, the joint plate at the left of the web 5 has been designated by the letter C, while the joint plate at the right side of the web has been designated by the letter C'. The upper plate 8 of the joint plate C is then placed in position with the stud bolts projecting thru the openings 14 and the upper beveled edge 10 of the plate engaging the inclined surface 6' of the rail tread 6. A beveled washer 26 is placed over each stud bolt at the outer face of the plate 8 and a nut 27 threaded upon the bolt and locked in position by a cotter pin 28. The bolts 27 are turned tight and draw the upper edge of the plate into bearing engagement with the tread 6 and the lower edge of the plate into engagement with the web 5. The lower stud bolts 15' are then inserted thru the webs of the rails in a like manner as that of the stud bolts 15 and the lower plate 9 is placed in position with the stud bolt 15 extending thru the elongated slots 16. The lower plate 9 is held in position by partially tightening the nuts 27' which bear against beveled washers 26'. The lower plate 9 is offset longitudinally of the upper plate 8 as shown in Figure 1 in the initial placing of the lower plate with the upper tapering and beveled edge 13 engaging the lower tapering and beveled edge 11 of the upper plate.

Figure 2:
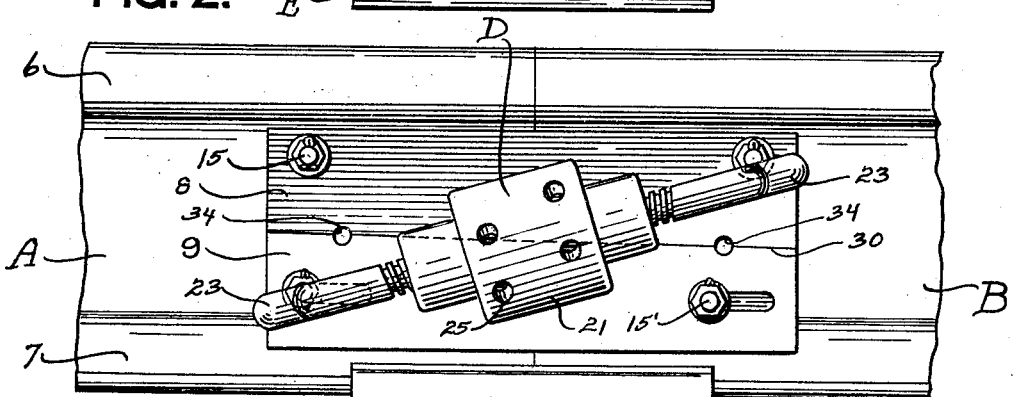
Figure 2 is a view similar to Figure 1 but showing the clamp having been operated for moving the lower plate into proper relation to the upper plate and showing the holes having been drilled or punched for receiving the locking rivets.
Figure 3:
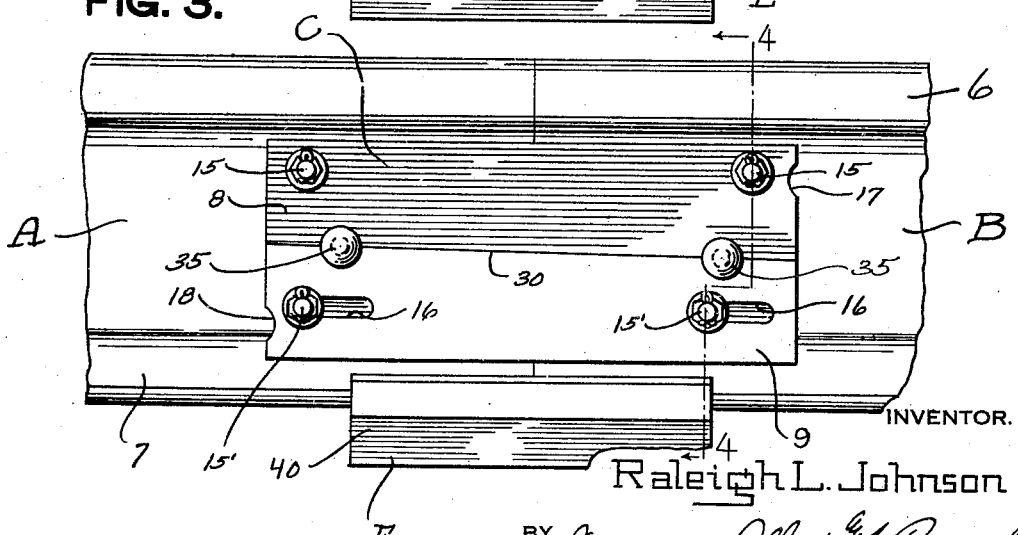
Figure 3 is a view showing the completed joint.

With the plates 8 and 9 in the assembled relation as shown in Figure 1, the hooked ends 24 of the clamping device D are placed one in the notch 17 and the other in the notch 18 of the plates 8 and 9 respectively and the turnbuckle 21 rotated so that the lower plate 9 is slid longitudinally with a wedging action beneath the plate 8, until the ends of the plates align as in Figure 2. As will be observed in Figures 1 and 2, the clamping device D extends diagonally across the joint plate so that the beveled joint 30 between the upper and lower plates is exposed at one end above one clamping arm 23 and at its other end exposed below the other clamping arm. This sliding movement of the lower plate by the clamping device D causes the upper edge of the top plate 8 to firmly bear against the under side of the rail tread 6 and the lower edge of the bottom plate 9 to bear firmly upon the base flange 7 with the beveled joint 30 bearing firmly against the central portion of the web 5. If such is found necessary, the bolts 27' may then be further tightened for further wedging the lower plate 9 in position.

As will be noted in Figure 4, the shoulders 20 on the stud bolts 15 and 15' permit tightening of the bolts 27 and 27' without requiring threaded connection of the stud bolts with the web 5.

With the joint plate C in the position as shown in Figure 2, the joint plate C' is arranged at the opposite side of the web 5 by first applying the upper plate 8 and fastening the plate by the nuts 31. The lower plate 9 is then placed in position and fastened by the nuts 32. A second clamping device is then applied to the plates 8 and 9 of the joint plate C' in the manner as shown in Figure 1 and the lower plate slid longitudinally by the clamping device into wedging relation with the upper plate.

With the clamping devices D still connecting the upper and lower plates of the joint plates C and C', a hole is either drilled or punched thru each end portion of the joint plates as at 34 and thru the web of the rails at points along the beveled joints 30. A rivet 35 is then placed thru each of the openings 34 and upset so that the heads thereof overlap the joints 30. As will be observed in Figure 2, the openings 34 are formed half in each of the plates 8 and 9 and thus the shanks of the rivets form locks preventing relative longitudinal movement of the upper and lower plates. The clamping devices D may then be removed by rotating the turnbuckles 21.

The top edges of the upper plates 8 may then be welded as at 36 to the under side of the tread 6 and the lower edges of the lower plates 9 welded as at 37 to the base 7. The meeting edges 11 and 13 are also welded as at 38 along the beveled joint 30 so that the joint plates C and C' provide supports at each side of the webs of the rails.

Referring now to the rest plate E for positioning beneath the meeting ends of the rail sections A and B, the same comprises a pair of interlocking clamp sections 40 and 41 provided with flat rest plates 42 and 42' respectively provided along their outer edges with upwardly and inturned lips 43. The inner edge of the base plate 42 is formed with a depending L or hook flange 44 extending diagonal to the straight outer edge provided with the lip 43. The inner edge of the base plate 42' is formed with a diagonally extending upwardly opening groove or keyway 45 formed along one edge with a C flange 46 for slidably receiving with an interlocking fit, the flange 44 of the base plate 42. The clamp sections 40 and 41 are intended to be placed beneath the abutting ends of the rails with the lips 43 engaging over the edges of the rail base 7 with the interlocking flanges 44 and 46 serving to prevent lateral movement of the sections. With one of the clamp sections bridging the joint between the rails sections A and B, the companion section is driven in a direction longitudinally of the companion section so that the lips 43 are drawn toward one another into firm contact with the edges of the base of the rails. After the interlocking clamp sections are in position the lips 43 are preferably welded as at 48 to the rail base 7. This sliding and interlocking engagement of the sections 40 and 41 does not require that a cross tie or sleeper be disposed beneath the meeting ends of the rails.

Thus it will be seen that the rest plate E co-acts with the joint plates to prevent any possible movement of the abutting rail ends either laterally or vertically.

The joint plates can be used to provide either a fixed or expansion type of joint, and when providing an expansion type of joint the joint plates C and rest plate E are merely welded to one of the rails. It is also to be understood that in some instances the welding of the joint plates to the rail ends may be dispensed with and the rails joined solely by the stud bolts and rivets.

Thus it will be seen that an improved form of rail joint is provided wherein the joint plates engage the abutting rail ends with a wedge fit and will not work loose due to vibration. It will also be apparent that by providing the joint plates in sections adapted to be shifted into wedging relation, provides an arrangement whereby the joint plates have firm bearing contact with the rail ends.

Changes in detail may be made to the form of invention herein shown and described, without departing from the spirit of the invention or the scope of the following claims.

I claim:

1. In a rail fastener the combination with abutting ends of a pair of rails, of a joint plate embodying upper and lower plate sections having a combined height greater than the distance between the tread and flange of the rails when the ends of the plate sections are in vertical alignment, said plate sections having their meeting edges extended diagonally to the upper and lower straight edges of the joint plates, and means for securing the plate sections to the rails with the meeting edges of the plate sections contacting with the rail webs.

2. In a rail fastener the combination with abutting rail ends, of a joint plate embodying upper and lower plate sections having a combined height greater than the height of the webs of the rails, and means securing the plate sections to the rails with the meeting edges of the plate sections contacting the rail webs and the upper and lower edges of the joint plates spaced from the webs and respectively contacting the tread and flange of the rails.

3. In a rail fastener the combination with abutting rail ends, of a joint plate comprising upper and lower plate sections, means for securing the upper plate section with its upper edge contacting the under side of the rail tread and its lower edge contacting the web, and means for securing the lower plate section with its lower edge contacting the flange of the rails and its upper edge abutting the lower edge of the upper plate section in contact with the web.

4. In a rail fastener the combination with a pair of abutting rail ends, of a joint plate embodying upper and lower plate sections, said upper plate section having a straight upper bearing edge and a beveled tapering lower edge, said lower plate section having a straight lower bearing edge and a beveled tapering upper edge providing a beveled joint between the plate sections, and means for independently securing the plate sections to the web of the rails with the plate sections in angular relation to one another and contacting the web at a point along the beveled joint between the upper and lower plate sections.

5. In a rail fastener the combination with a pair of abutting rail ends, of joint plates spanning the joint at each side of the rails each embodying an upper plate section and a lower plate section having a wedging fit between the lower edges of the upper plate sections and the flanges of the rails when slid longitudinally of the upper plate sections, securing means connecting the upper plate sections to the rails, and securing means fastening the lower plate sections to the rails, said joint plates having line contact with the webs of the rails and being spaced from the web at their upper and lower edges.

6. In a rail fastener the combination with a pair of abutting rail ends, of joint plates spanning the rail joint at each side of the web each embodying an upper and lower wedge plate, said lower wedge plate when slid longitudinally of the upper wedge plate causing the joint plates to have a wedge fit between the tread and flanges of the rails, and means for independently securing the upper and lower wedge plates to the rail webs.

7. In a rail fastener the combination with abutting rail ends, of joint plates arranged at opposite sides of the rails each embodying upper and lower wedge plates having diagonal meeting edges providing a wedging action between the tread and flanges of the rails when the lower wedge plate is moved longitudinally of its upper wedge plate, stud bolts connecting the upper wedge plate to the web of the rails, and stud bolts connecting the lower wedge plate to the webs of the rails with the joint plates having line contact with the webs of the rails at a point substantially midway between the tread and flanges of the rails.

8. In a rail fastener the combination with abutting rail ends, of joint plates arranged at opposite sides of the rails each embodying upper and lower wedge plates having diagonal meeting edges providing a wedging action between the tread and flanges of the rails when the lower wedge plate is moved longitudinally of its upper wedge plate, and stud bolts connecting the pairs of upper and lower wedge plates to the webs of the rails, said stud bolts having shoulders engageable with one side of the web permitting assembling of the wedge plates at one side of the rail.

9. In a rail fastener the combination with a pair of abutting rail ends, of joint plates each embodying upper and lower wedge plates for wedging relation between the tread and flanges of the rails upon longitudinal movement of one of the wedge plates, said wedge plates when in position having only line contact at their meeting edges with the web of the rails, a stud bolt connecting the upper wedge plate to the rails, stud bolts connecting the lower wedge plate to the rails, and rivets connecting the joint plates to the webs at their points of line contact with the web.

10. In a rail fastener the combination with abutting rail ends, of joint plates each embodying a pair of upper and lower wedge plates for wedging relation between the treads and flanges of the rails upon longitudinal movement of one of the wedge plates, means for securing the upper wedge plate to the rail web, means for securing the lower wedge plate with a sliding fit to the rail web, means for moving the lower wedge plates longitudinally into wedging relation between the lower edges of the upper wedge plates and rail flanges, and means securing the wedge plate against relative longitudinal movement with the meeting edges of the upper and lower wedge plates contacting the rail webs.

11. In a rail fastener the combination with abutting rail ends, of joint plates each embodying an upper plate and a lower wedge plate, means for securing the upper plate to the rail webs, means connecting the lower wedge plate with a sliding connection to the rail webs to permit a wedging action between the upper plate and rail flanges upon longitudinal movement of the lower wedge plate, a clamping device for longitudinally moving the wedge plates, and rivets connecting the joint plates to the webs along the joint of the upper and lower plates.

12. In a rail fastener the combination with abutting rail ends, of a joint plate embodying upper and lower plate sections having oppositely tapering meeting edges, a notch formed in the widest end of each plate section, means for securing the upper plate section to the rail webs, means connecting the lower plate section with a sliding fit to the rail webs, and a clamping device for moving the lower plate section logitudinally of the upper plate section embodying clamp arms having hooked ends for engaging in the notches of the plate sections.

13. In a rail fastener the combination with abutting rail ends, of a joint plate embodying upper and lower plate sections having oppositely tapering meeting edges, a notch formed in the widest end of each plate section, means for securing the upper plate section to the rail webs, means connecting the lower plate section with a sliding fit to the rail webs, a clamping device including clamp arms engageable in the notches for moving the lower plate longitudinally of the upper plate, and rivets connecting the joint plates to the rail webs along the joint between the plate sections.

14. As an article of manufacture, a joint plate comprising a pair of upper and lower wedge plates having oppositely tapered edges, said upper plate having circular openings and the lower plate having elongated openings, and a notch provided in the widest end of each plate.

15. A joint plate comprising a pair of elongated upper and lower wedge plates, the upper plate having a beveled straight upper edge and a beveled tapering lower edge beveled in a like direction as the bevel of the upper edge, and said lower plate having a beveled straight lower edge and a beveled tapering upper edge beveled opposite to the bevel of the lower edge, said upper plate having circular openings and the lower plate having longitudinally elongated openings, and a notch provided in the broader end of each wedge plate.

RALEIGH L. JOHNSON.